United States Patent [19]

Martin

[11] Patent Number: 4,550,773
[45] Date of Patent: Nov. 5, 1985

[54] HEAT EXCHANGER

[75] Inventor: Gerald L. Martin, Minneapolis, Minn.

[73] Assignee: EER Products Inc., Minneapolis, Minn.

[21] Appl. No.: 576,352

[22] Filed: Feb. 2, 1984

[51] Int. Cl.⁴ .............................................. F24H 3/02
[52] U.S. Cl. ...................................... 165/54; 165/166
[58] Field of Search ............................. 165/54, 78, 166

[56] References Cited

U.S. PATENT DOCUMENTS

| | | | |
|---|---|---|---|
| 3,292,688 | 12/1966 | Shrader | 165/78 X |
| 3,666,007 | 5/1972 | Yoshino et al. | 165/166 |
| 4,377,201 | 3/1983 | Kruse et al. | 165/166 X |
| 4,377,400 | 3/1983 | Okamoto et al. | 165/166 X |

Primary Examiner—Stephen F. Husar
Attorney, Agent, or Firm—Hugh D. Jaeger

[57] ABSTRACT

Heat exchanger which is a draw-through, self-contained, central ducted system. Heat exchanger can be used with a furnace or installed separately in any system. Supply and exhaust direct-drive blowers provide air flow against high resistance laminar, straight-thru/-non-turbulent air flow of true cross-flow sized elements providing separation of air flow for side-by-side air flow with counter-flow heat transfer. The system is heavy duty, aluminum, cross flow, double-pass heat exchanger. The system includes drain pans and front and back access panels which provides easy access to the heat exchanger for cleaning as required. The electrical parts are on a slide out tray for easy servicing. The heat exchanger can be used in residential, commercial, or industrial environments.

2 Claims, 5 Drawing Figures

TRUE CROSS FLOW
STRAIGHT-THRU DESIGN FOR
MAXIMUM HEAT TRANSFER

HEAT EXCHANGER

BACKGROUND OF THE INVENTION

1. Field of the Invention

The present invention pertains to a heat exchanger, and more particularly, provides a heat exchanger for home heat recovery for purging of stale air and bringing fresh oxygen while providing air-to-air recovery with negligible loss of heat.

2. Description of the Prior Art

Prior art fresh air systems fail to recover any of the heat wasted through normal ventilating methods. The prior art systems were either air restricting, or had no restriction whatsoever, in effect bringing in cold air which required heating of the air while hot air was discharged into the outside.

Other prior art heat exchangers failed to have a high percentage of recovery. Heat exchangers of the past have not provided high percentage recovery of heat.

The present invention provides a vertically mounted, draw-through, self-contained, central ducted system for air-to air heat exchange reclaiming up to 90 percent of heat from exhausted stale air for subsequent transfer to incoming cleaner air.

SUMMARY OF THE INVENTION

The present invention provides an air-to-air heat exchanger which recovers up to 90 percent of heat through normal venting methods where fresh air is introduced into the air exchange unit through a series of aluminum plates, which are laminar, straight-thru/non-turbulent air flow with true counter-flow design of plate separation of air flows. The heat exchanger provides a draw-through unit in a double pass maximizing efficiency of the elements by pulling both the supply and the exhaust air past respective exchange plates twice to more evenly distribute the flow achieving up to a 90 percent efficiency.

According to one embodiment of the present invention, there is provided a heat exchanger in a vertically mounted, draw-through, self-contained, central ducted system, which can be utilized with a furnace or installed separately in a house, including supply and exhaust, direct-drive squirrel cage blowers, or the like, which are capable of air flow against the high resistance of small connecting ducts, the ducts provide for air flow of a true counter-flow design providing laminar, straight-thru/non-turbulent air flow of an aluminum, cross-flow, double pass heat exchanger element, which is divided down the middle, whereby the housing provides for exclosure of the squirrel cage fans, the heat exchanger with the supply and exhaust in and out ducts through the separated heat exchanger thereby providing the side-by-side air flow with the counter-flow heat transfer where the system pulls the supply and exhaust air past the respective exchange plates in a through downward flow, across the bottom, and a through upward flow providing even distribution with double exposure towards a 90 percent efficiency.

One significant aspect and feature of the present invention is a side-by-side air flow with a counterflow heat transfer through the laminar, straight-thru/non-turbulent air flow of the true counter-flow design of the plate separation of air flows. This provides that the heat exchanger stays clean over longer operating periods with maximum utilization of heat transfer surface while the versatile design capability provides the multiple configurations while withstanding rigors of contaminants and abrasives with no cross contamination and where the condensation is removed into drain pans to prevent freeze-up.

Another significant aspect and feature of the present invention is a heat exchanger which recovers up to 90 percent of the heat which would otherwise be wasted through normal ventilating procedures. The heat exchanger operates on the principal of the aluminum being an excellent conductor of heat with side-by-side air flow with counter-flow heat transfer.

A further significant aspect and feature of the present invention is the blow or draw-through double pass feature which maximizes the efficiency of the element plates where the system pulls both the supply and the exhaust air past the respective exchange plates twice in a through downward flow, across the bottom, and a through upward direction to more evenly distribute the flow truly maximizing heat transfer.

Having best described one embodiment of the present invention, it is the principal object hereof to provide a heat exchanger with side-by-side air flow with counter-flow heat transfer.

An object of the present invention is to provide air-to-air heat exchanger for a fresh, healthful environment with good ventilation and cost-saving energy efficient air exchange. The recovery is up to 90 percent efficient.

DESCRIPTION OF THE PREFERRRED EMBODIMENTS

Figure 1:
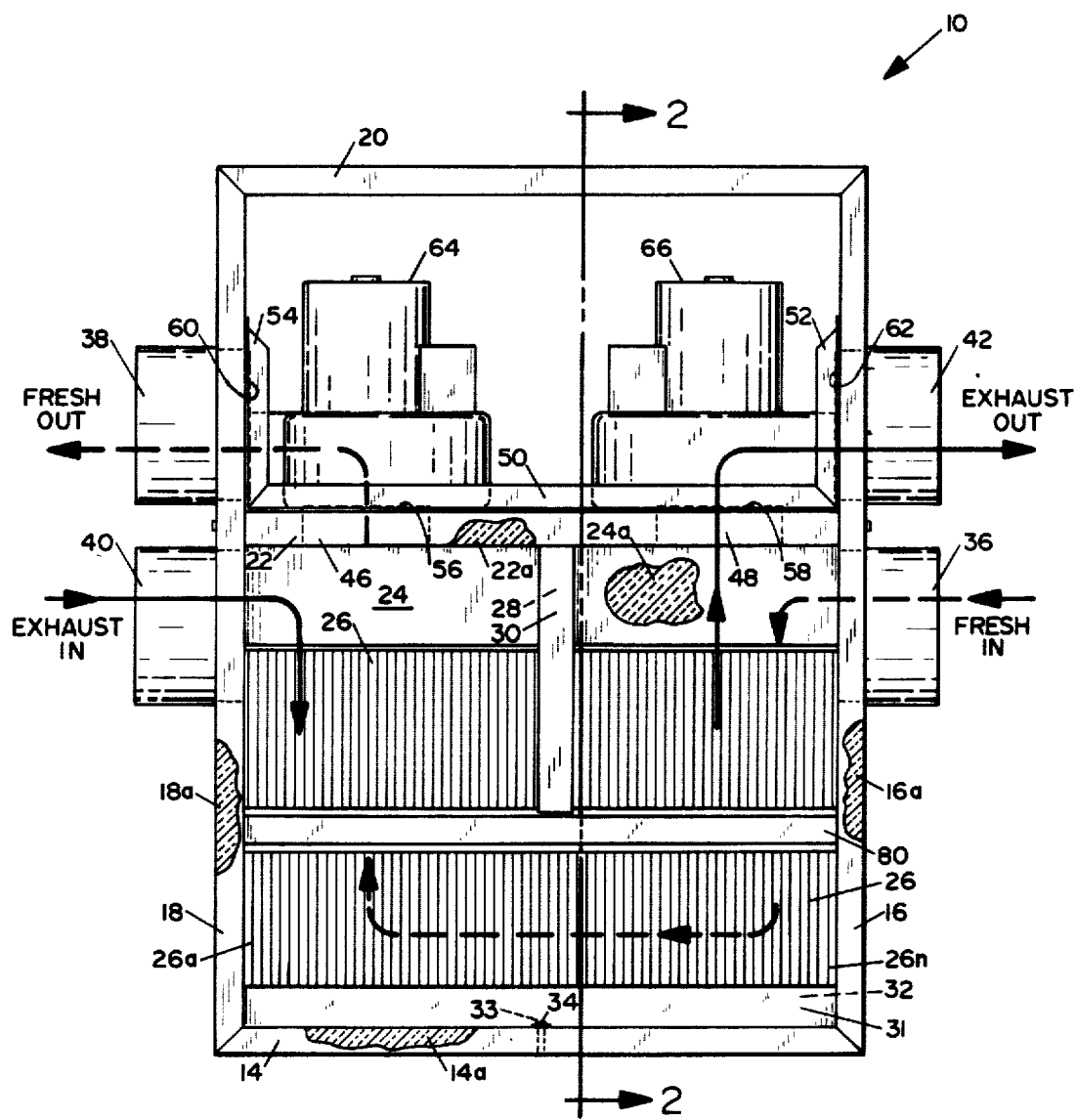
FIG. 1 is a front view of a heat exchanger, the present invention, where the adverse view is exactly identical.

FIG. 1 illustrates a front view of a heat exchanger 10 including a rectangular housing. The rectangular housing includes an insulated bottom 14, insulated right and left side 16 and 18 respectively, and a top 20 where the entire housing can be formed of galvanized sheet metal with opposing flanged edges. Fiberglass insulation 14a, 16a, 18a, 22a and 24a such as the 1 inch fiberglass with aluminum foil bonded to either side or both sides in this instance secures with glue, adhesive, or the like between the flanged edges and flush with the inner sides of the bottom, top, right and left sides respectively as illustrated at the cut away portions. The top 20 is a plane piece of metal with no insulation. A insulated shelf 22 includes opposing downward flanges and fiberglass insulation 22a there between as illustrated in the cut away portion. The insulated shelf 22 is positioned at the top third of the housing. An insulated panel 24 with insulation 24a at cut away exposed portion, extends downwardly from the center mid-portion of the shelf 22. A heat exchanger, 26 supports one edge of insulated panel 24 and extends upwardly between the sides 16 and 18 providing for axial air passage at a 45° angle. The heat exchanger 26 is a laminar, straight-thru/non-turbulent air flow of true counter-flow design with a plurality of sized aluminum elements of heavy duty construction providing plate separation of air flows with inherent accessibility, low maintenance and non-freeze-up. FIG.

Figure 2:
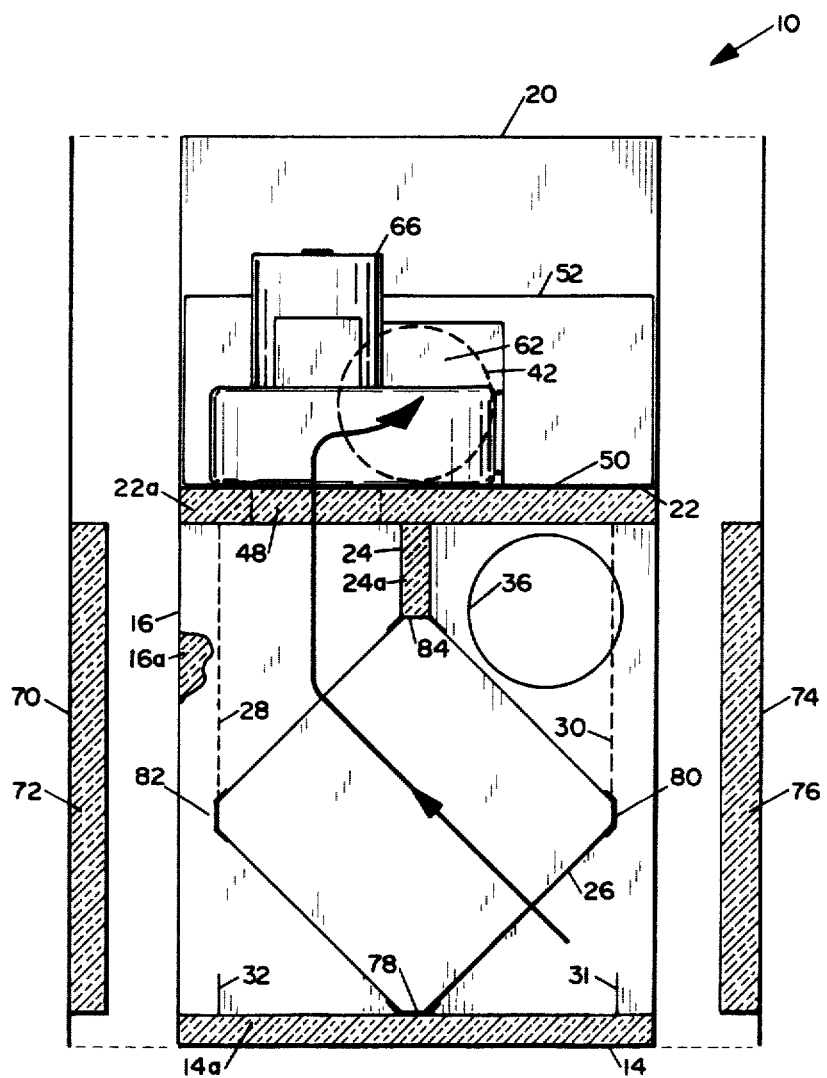
FIG. 2 is a side view cut away on section line 2—2.

3B shows the particular construction of the elements 26 of the heat exchanger 10. Opposing dividing panels 28 and 30, as also illustrated in FIG. 2, are positioned in an equal symmetrical relationship and extend down into the heat exchanger as illustrated in dashed lines of FIG. 2, and sealed at the exchanger element with silicone glue or the like. Troughs 31 and 32 provide for condensation, containment, and removal and as a drain pan to prevent freeze-up. Drain plugs 33 and 34 provide for the removal. Fresh air in duct and hole 36, fresh air out duct and hole 38, exhaust air in duct and hole 40, and exhaust air out duct and hole 42 are positioned where ducts 42 and 38 are in opposing symmetrical relationship with respect to each other, and ducts 36 and 40 are in opposing diametrical relationship with each other. Downwardly extending fresh air out hole 46 and exhaust air out hole 48 are in opposing diametrical relationship with respect to each other through shelf 22.

A removable shelf 50 including a right side 52 and a left side 54 with opposing inwardly extending edges for structural supports engages symmetrically and coincides just slightly shorter than the insulated shelf 22, and includes air exhaust holes 56 and 58 and air exhaust holes 60 and 62 respectively. Squirrel cage blowers 64 and 66 secure between the holes 56 and 60 for blower 64 and holes 58 and 62 for blower 66. The assembly slides into the shelf and for easy maintenance, as well as accessibility to the system with all holes aligned between the sliding shelf, the sides, and the insulated shelf.

Access panel 70 with insulation 72 and access panel 74 with insulation 76 are provided for engaging with the front and back of the heat exchanger 10 as illustrated by the dash lines in FIG. 2, and are secured by sheet metal screws or the like.

The arrows in FIG. 1 illustrate the respective air flow from the respective ducts through the heat exchanger 10. The double path provides the counter-flow heat transfer side-by-side air flow.

FIG. 2 illustrates sectional view taken along line 2—2 of FIG. 1 where all numerals correspond to those elements previously described. Of particular importance is the geometry of the dividing panels 28 and 30 while the heat exchanger encompasses the lower third and a portion of the middle third of the cabinet. The heat exchanger element 26 divides the air flow cavities by the bottom edge 78 with base 14, side edges 80 and 82 with access panels and top edge 84 with panel 24. The bottom third is defined by base 24 and edges 80 and 82, middle third between edges 80 and 82, and shelf 22, and top third between top 20 and shelf 22. The air flows diagonally at an angle through the plurality of plates of the heat exchanger element 26. The angle of air flow can be in the range of 45° and either side thereof such as 10°-80°. Also of importance, is the symmetry of the heat exchanger system 10. The arrows illustrate the air flow appropriately through the chambers. Air travels longitudinally along the lower third and above the base of the housing. The middle third compartment is divided into halves respectively between each side of the panels 28 and 30.

Figure 3A:
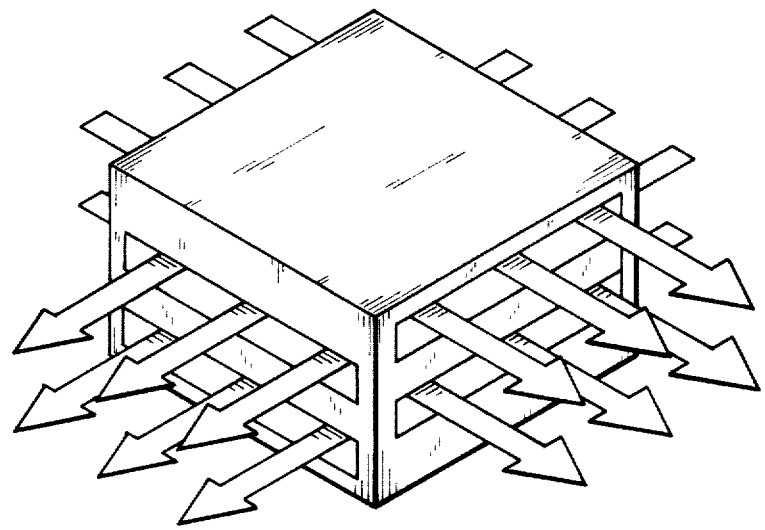
FIG. 3A is a flow view of a heat exchanger element.

FIG. 3A illustrates a representation of the elements of the heat exchanger showing the true cross-flow, straight-thru design for maximum heat transfer for bringing in a fresh air supply for subsequent heated air supply by hot exhaust air transferring heat thereby providing cooled exhaust air out. These particular types of heat exchangers are manufactured under the trade name Heatex air-to-air heat exchanger with flat plate construction, double counter-flow configuration. Any type of suitable exchanger can be utilized including plastic, fiberglass, stainless steel, or the like and can be utilized in applying the principles and teachings of the present invention.

Figure 3B:
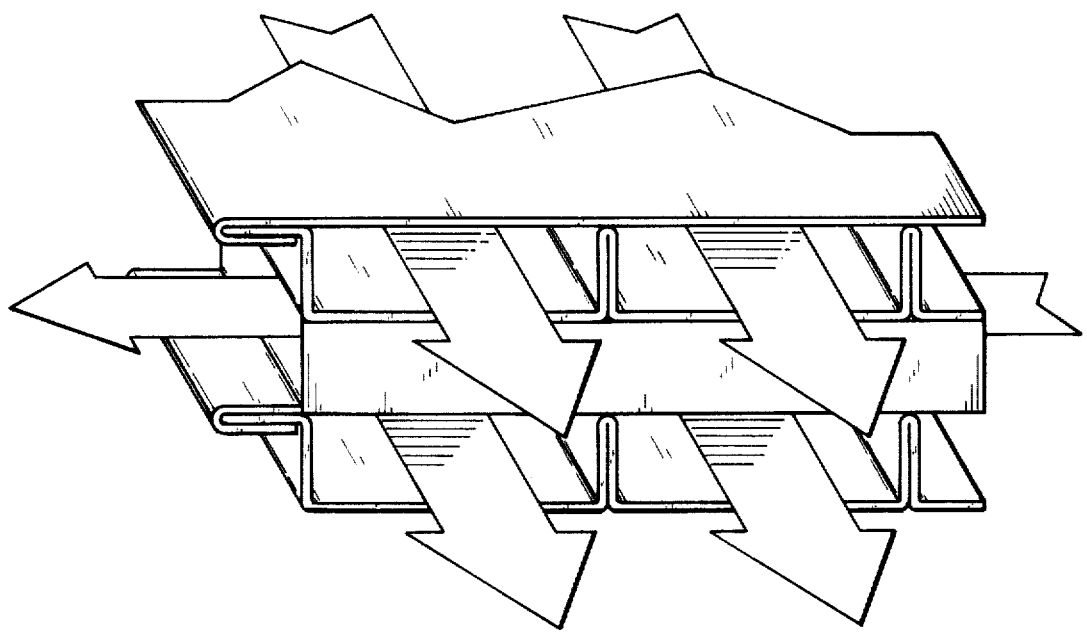
FIG. 3B is a view of a section of the heat exchanger element.

FIG. 3B illustrates a view of a section of the heat exchanger element 26 where each element is illustrated as shown. The air flow is perpendicular to opposing adjacent chambers.

MODE OF OPERATION

Figure 4:
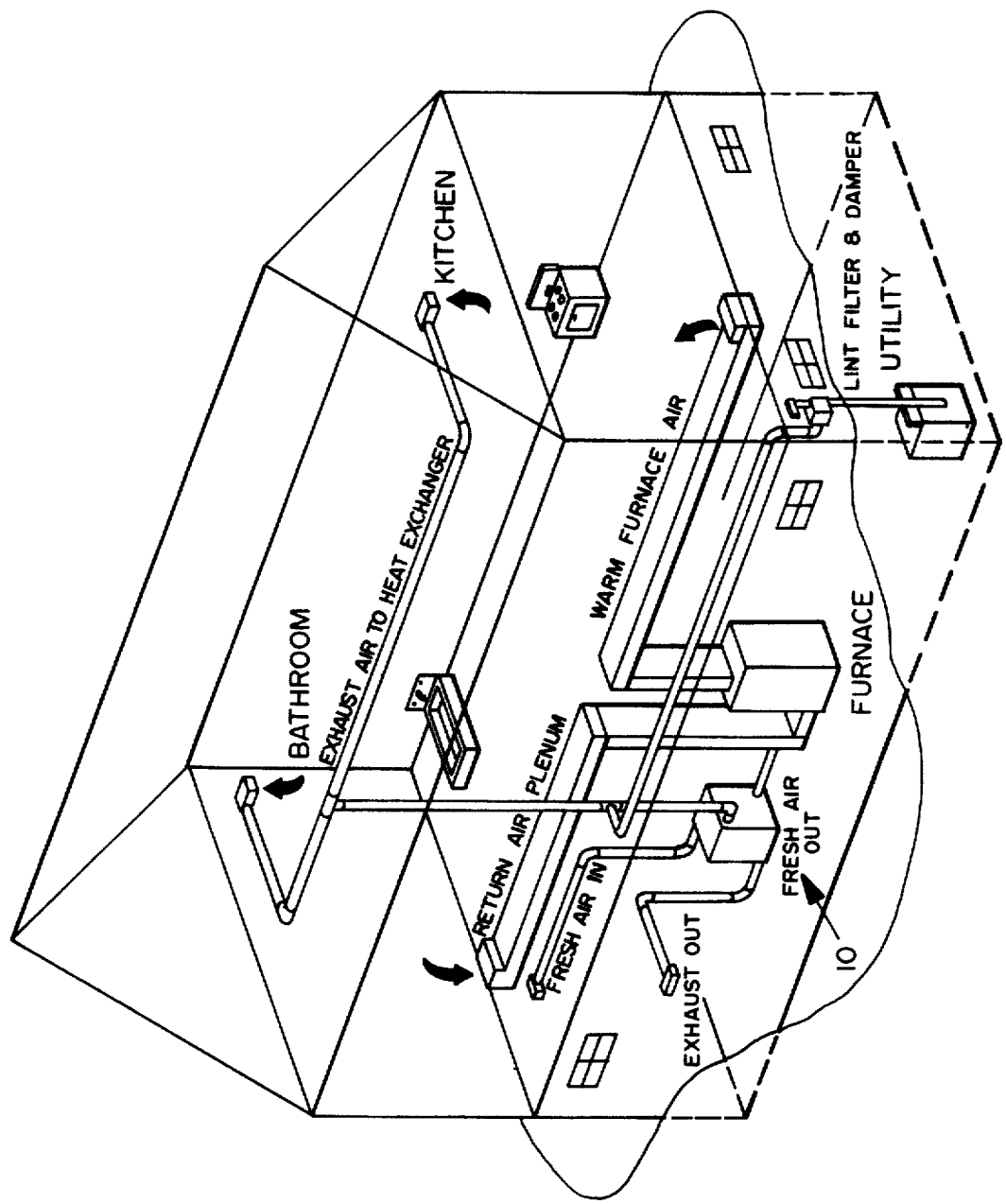
FIG. 4 is a heat recovery system in a home environment in combination with a furnace.

FIG. 4 illustrates a heat exchanger installed in a residential environment, the heat exchanger 10 of FIGS. 1–3 illustrating the side-by-side air flow with the counter-flow heat transfer accordingly.

The heat exchanger 10 provides for fresh air in and fresh air out with heating of the fresh air through the exhaust air in and exhaust air out. This side-by-side air flow with the counter-flow heat transfer is illlustrated by FIGS. 1–3 of the heat exchanger 10 providing for efficiency of up to 90 percent. The flat plate construction of the heat exchanger 26 provides the laminar, straight-thru air flow for non-turbulent/low pressure drop with the double cross-flow configuration with plate separation of the exhaust and supply air streams, eliminating any contamination of exhaust air into the fresh air system. The supply and exhaust blowers deliver designed air flow against the resistance of the connecting ducts. Efficiencies can reach in the range of up to 90 percent through the use of heavy aluminum heat exchanger element plates. The fiberglass insulation is 1 inch, $3\frac{1}{2}$ pound fiberglass with foil linings. The frame and other components can be aluminum or galvanized steel preventing corrosion. The duct connections can be 4 inches round while the blower motors can can be 80 watts at 1 amp at 130 CFM for example and not to be limiting of the present invention.

The heat exchanger 10 will reduce furnace or boiler size, air conditioner size, prevents water or ice build-up, and eliminates stale house odors. The heat exchanger provides fresh ventilation air for healthy living at moderate costs. This saves heat lost from the bathroom exhaust, kitchen hood, cloths dryer, or furnace boiler or hot water heater. The system eliminates forming ice or water on windows, water film on walls or the stuffy or uncomfortable feeling while provididng for lower fuel bills and a vapor barrier to seal coid air outside.

The air flow within the heat exchanger 10 is based on the side-by-side air flow with the counter-flow heat transfer. The heat exchanger can recover as high as up to 90 percent of the heat energy normally lost through ventilation.

Having thus described the invention, what is claimed is:

1. Heat exchanger comprising;
   a. means for side-by-side laminar straight-thru non-turbulent air flow with counter flow heat transfer and exchange;
   b. means for housing said heat transfer means in a lower two third portion and fresh air supply means and exhaust air means in an upper third portion of said housing means including exhaust air out and fresh air out ducts symmetrically opposing each other, and fresh air in and exhaust air ducts in diametrically opposing each other in said housing means, said exhaust air out and said fresh air out ducts in an upper third portion of said housing means and connected to blowers, said fresh air in and exhaust air in ducts are in a middle third portion of said cabinet, said blowers mount on a slideable tray also in an upper third portion of said cabinet and aligned with said exhaust air out holes and air passage holes between an upper third and said middle third portion of said cabinet; and, c. divider means in a lower third of said housing means extending into said heat exchanger means for providing a lateral downward path an a lateral upward path through said heat exchanger means.

2. Heat exchanger comprising a housing including an insulated bottom member; insulated right and left sides, and a top; sides, top and bottom including inwardly extending flanges; foil sided fiberglass insulation positioned in the interior of the bottom, right, and left sides, an insulated shelf with downwardly extending flanges, foil covered fiberglass insulation on the bottom side thereof; a downwardly extended insulated panel of two opposing pieces of metal with fiberglass insulation there between; a laminar, straight-thru/non-turbulent air flow heat exchanger stood on an edge; opposing dividing panels extending downwardly and into opposing heat exchanger panels for division thereof; two opposing drain troughs; opposing drain plugs; front and rear panels with foil insulation for enclosing the chambers and providing for air flow on a diagonal line down across the bottom and on a diagonal line up and matching with edges of said heat exchanger; a sliding tray substantailly U-shaped with inwardly extending flanges supporting squirrel cage blowers; symmetrically opposing fresh air and exhaust air out holes in an upper portion; a diametrically opposing fresh air in and exhaust air in holes in a midportion; and blower holes extending between said slidable tray and said insulated shelf, whereby the air flow takes a diagonal pattern from the fresh air in and exhaust air in down to opposing sides of the lower portion, across the bottom and then diagonally upward in the opposing chambers to the exhaust air out and fresh air out through the blowers.

* * * * *